Patented Nov. 27, 1934

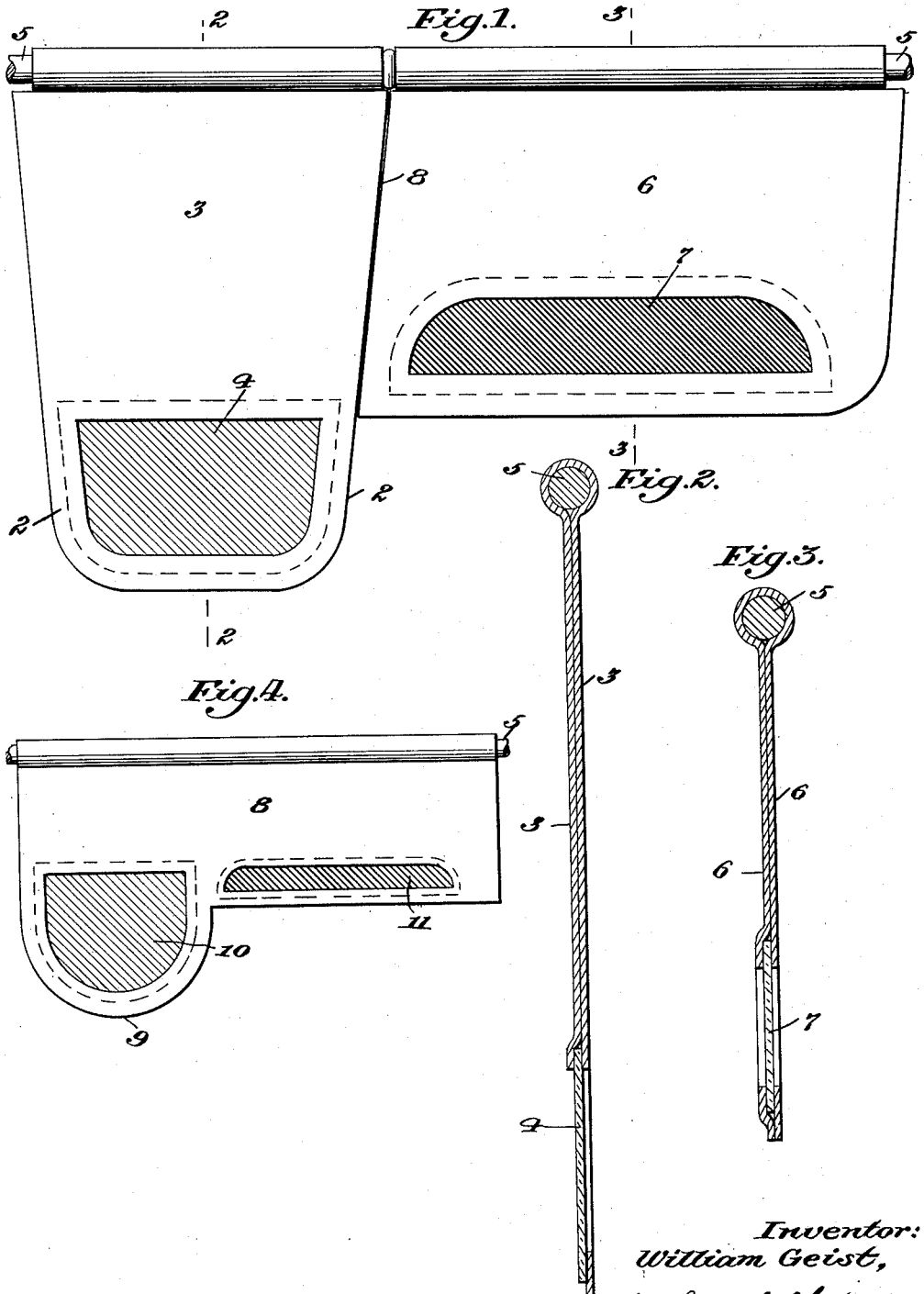

1,982,511

UNITED STATES PATENT OFFICE 1,982,511

GLARE PROTECTOR FOR AUTOMOBILES AND OTHER VEHICLES

William Geist, Clayton, Mo.

Application October 19, 1933, Serial No. 694,314

6 Claims. (Cl. 296—97)

My invention pertains to a combined protector for use on vehicles, especially automobiles, for protecting the driver thereof from the glare of the sun rays as well as the glare of lights carried by approaching automobiles, street cars and other vehicles, and constitutes an improvement on the patent granted to me under date of March 5, 1918, No. 1,258,107.

The prime object of the invention is to provide a simple, economical and thoroughly efficient device that will properly protect the driver of automobiles and other vehicles from the glare of the sun rays as well as from the glare of approaching lights, each portion of the device being operated singly, jointly or independently, thereby assuring increased safety during the driving of automobiles and other vehicles on the public streets and highways, and at the same time permit automobiles to be provided with bright, brilliant lights.

Another object of the invention is to so construct my improved glare protector that it simultaneously serves to protect the driver from both the rays of the sun and the glare from approaching bright lights; that either portion of the protector can be quickly moved or adjusted out of the way independent of the other portion to increase the area of visibility for said driver, and to provide said protector with a plurality of semi-transparent colored panes, each of said panes possessing a different degree of visibility.

The foregoing and such other objects as may appear from the ensuing description are attained by the construction, arrangement, location and combination of the several parts hereinafter more fully described, illustrated by the accompanying drawing and specifically pointed out in the claims appended hereto, it being understood that slight changes in the precise shape, proportions and minor details of the construction may be resorted to without departing from the spirit or sacrificing any of the advantages of the invention.

In the accompanying drawing forming a part of this specification it will be seen that:

Figure 1 is an elevation of the improved glare protector embodying my invention.

Figure 2 is an enlarged sectional elevation taken in the plane of the dotted lines 2—2, Fig. 1.

Figure 3 is an enlarged sectional elevation taken in the plane of the dotted lines 3—3, Fig. 1, and Figure 4 is an elevation of a slight modification of my improved device shown on a reduced scale.

In the embodiment of my invention as illustrated it will be seen that Fig. 1 shows my improved protector device, comprising a combined sun vizor and a light glare portion disposed horizontally with relation to each other and supported in any desirable manner so as to permit either the right or the left hand portion to be adjusted to any suitable position. The said device consists of a drop or downwardly extended portion 2 formed from a sheet of any suitable opaque material 3 folded upon itself and provided at its lowermost portion with a semi-transparent colored pane 4 preferably of a light green shade, said sheet and pane shown as being supported by a suitable rod 5 broken away at each end thereof, and at the right of said sheet 3 is shown another sheet 6 also folded upon itself and composed of any suitable opaque material, said sheet 6 being provided at its lower end portion with a transparent colored pane 7 of any desirable material, preferably of a dark green shade suitably secured to said sheet 6, the sheet being also supported by the rod 5 in horizontal alinement with the sheet 3.

It will be perceived that the sheets 3 and 6 are separated at the point 8, thus forming two parts of the protector, and permitting the part to the left with the drop or downwardly extended portion provided with the semi-transparent material insert to be used and to be shifted into any suitable, desirable or satisfactory position at night for protection from the glare of headlights on automobiles coming from the opposite direction when placed in front of the driver, and permits that portion to the right to be turned upwardly out of the way or to be shifted into any suitable or satisfactory position in order to furnish more visibility at night, and at the same time give the proper protection, said portions 3 and 6 to be used independent of each other or simultaneously, as may be desired.

It will be readily obvious that the combined device when in the position shown in Fig. 1 will at all times furnish the desired and necessary protection against the sun, and by the use of the lighter semi-transparent material and a darker transparent material furnishes a better protection for the eyes; since it permits the driver to rest his eyes by using or shifting his eyes from the lighter to the darker colored pane and back to the other at will.

It will be understood that the use of certain hardware, trimmings, fastening or supporting means is not intended to form any material part of this invention; that the opaque material may be of any desirable kind, and that, while the semi-transparent material or panes are shown as being of light and dark green color, any suitable color or colors may be employed that will properly serve the intended purpose.

Referring to the slightly modified form of my invention as shown in Fig. 4 of the drawing, it will be seen that the numeral 8 designates a single piece of any suitable or desirable opaque material folded upon itself and formed with a drop or downwardly extended portion 9, at the left side thereof, provided with a semi-transparent material or pane 10 secured therein of a light green shade, while the other or right side of the combined sun and glare vizor is provided with semi-transparent material or pane 11 of a darker green shade suitably secured therein, said semi-transparent material or panes being disposed within the opaque material for the purpose of protected vision therethrough.

Having thus described my invention, what I claim and desire to secure by Letters Patent is:

1. A combined glare protector formed of opaque material having an integral drop or downwardly extended portion at its left hand side thereof, a semi-transparent colored material fixedly secured within the opaque material at its lower extended portion, and a semi-transparent colored material secured within and between the opaque material at the right hand side thereof above said drop portion.

2. A combined glare protector of the character described formed from a single piece of flexible opaque material folded upon itself and provided with an integral drop portion at the left hand side thereof, a semi-transparent light colored material fixedly secured within on the folded drop portion at its lower end, and a semi-transparent darker colored material fixedly secured within the opaque material at the lower end of its right hand side.

3. A combined glare protector of the character described formed from a single piece of flexible opaque material folded upon itself with an integral drop portion disposed at its lower left hand side, a semi-transparent material fixedly secured within and between the fold at the lower end of said drop portion, and a semi-transparent material fixedly secured within the lower portion of the fold of the opaque material at the right hand side thereof.

4. A combined glare protector of the character described, comprising a left hand portion of flexible opaque material folded upon itself and formed with an integral downwardly extended portion at its lower end, a semi-transparent light colored material fixedly secured within and between its folded lower end portions, and a right hand portion having a semi-transparent darker colored material fixedly secured within the opaque material between its fold at the lower end portion thereof.

5. A combined glare protector of the character described, comprising a left hand portion of flexible opaque material folded upon itself and formed with a downwardly extended portion curved at its lower end within the fold of which is fixedly secured a semi-transparent colored material of a light shade, and a right hand portion having fixedly secured within its fold at its lower end portion a semi-transparent colored material of a dark shade.

6. A combined glare protector of the character described, comprising a left hand portion of flexible opaque material folded upon itself having a semi-transparent material of a light green shade fixedly secured therein and between its fold at the downwardly extended and lowermost curved portion thereof, and a right hand portion having a semi-transparent material of a dark green shade secured within and between its fold at the lower end portion thereof.

WILLIAM GEIST.